US012641458B2

(12) United States Patent
Salkintzis et al.

(10) Patent No.: US 12,641,458 B2
(45) Date of Patent: May 26, 2026

(54) ROUND TRIP TIME DETERMINATION BASED ON ANALYTICS

(71) Applicant: Lenovo (Singapore) Pte. Ltd., New Tech Park (SG)

(72) Inventors: Apostolis Salkintzis, Athens (GR); Dimitrios Dimopoulos, Athens (GR); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 306 days.

(21) Appl. No.: 18/293,088

(22) PCT Filed: Sep. 9, 2021

(86) PCT No.: PCT/EP2021/074877
§ 371 (c)(1),
(2) Date: Jan. 29, 2024

(87) PCT Pub. No.: WO2023/006230
PCT Pub. Date: Feb. 2, 2023

(65) Prior Publication Data
US 2024/0334219 A1      Oct. 3, 2024

(30) Foreign Application Priority Data

Jul. 27, 2021     (GR) ............................... 20210100504

(51) Int. Cl.
*H04W 24/08*         (2009.01)
*H04W 76/10*         (2018.01)
(52) U.S. Cl.
CPC ........... *H04W 24/08* (2013.01); *H04W 76/10* (2018.02)

(58) Field of Classification Search
CPC ..... H04W 24/08; H04W 76/10; H04W 40/02; H04W 76/15; H04W 84/042; H04W 88/06; H04W 24/02
See application file for complete search history.

(56) References Cited

U.S. PATENT DOCUMENTS

| | | | | |
|---|---|---|---|---|
| 2023/0056442 A1* | 2/2023 | Ly | ......................... | H04W 24/04 |
| 2024/0015562 A1* | 1/2024 | Youn | ..................... | H04W 24/10 |
| 2024/0314058 A1* | 9/2024 | Mueck | .................... | H04L 41/40 |

OTHER PUBLICATIONS

PCT/EP2021/074877, "Notification of Transmittal of the International Search Report and the Written Opinion of the International Searching Authority, or the Declaration", International Searching Authority, Mar. 25, 2022, pp. 1-16.

(Continued)

*Primary Examiner* — Hashim S Bhatti
(74) *Attorney, Agent, or Firm* — Kunzler Needham & Hilton; Bruce R. Needham

(57)         ABSTRACT

Apparatuses, methods, and systems are disclosed for RTT determination based on analytics. One apparatus includes a processor that establishes a multiaccess data connection with a UPF in a mobile communication network. The multiaccess data connection enables data communication via a non-3GPP access network and via a 3GPP access network. The apparatus includes a transmitter that transmits a first performance measurement functionality message to the UPF. The first performance measurement functionality message triggers a request of a first type of analytics from a network data analytics function. The apparatus includes a receiver that receives a second performance measurement functionality message from the UPF in response to the network data analytics function providing the first type of analytics. The second performance measurement functionality message contains estimated RTT values for the non-3GPP access network and/or the 3GPP access network.

20 Claims, 11 Drawing Sheets

(56)             References Cited

OTHER PUBLICATIONS

TSG, "Presentation of TR 23.700-91: 'Study on enablers for network automation for the 5G System (5GS); Phase 2' to TSG SA for approval", TSG SA Meeting #SP-90E SP-200971, Dec. 8-14, 2020, pp. 1-2.

3GPP, "3rd Generation Partnership Project; Technical Specification Group Services and System Aspects; Architecture enhancements for 5G System (5GS) to support network data analytics services (Release 17)", 3GPP TS 23.288 V17.1.0, Jun. 2021, pp. 1-192.

3GPP, "3rd Generation Partnership Project; Technical Specification Group Services and System Aspects; System architecture for the 5G System (5GS); Stage 2 (Release 17)", 3GPP TS 23.501 V17.1.1, Jun. 2021, pp. 1-526.

3GPP, "3rd Generation Partnership Project; Technical Specification Group Services and System Aspects; Procedures for the 5G System (5GS); Stage 2 (Release 17)", 3GPP TS 23.502 V17.1.0, Jun. 2021, pp. 1-692.

3GPP, "3rd Generation Partnership Project; Technical Specification Group Services and System Aspects; Study on enablers for network automation for the 5G System (5GS); Phase 2 (Release 17)", 3GPP TR 23.700-91 V2.0.0, Nov. 2020, pp. 1-378.

3GPP, "3rd Generation Partnership Project; Technical Specification Group Core Network and Terminals; 5G System; Access Traffic Steering, Switching and Splitting (ATSSS); Stage 3 (Release 17)", 3GPP TS 24.193 V17.1.0, Jun. 2021, pp. 1-67.

* cited by examiner

800

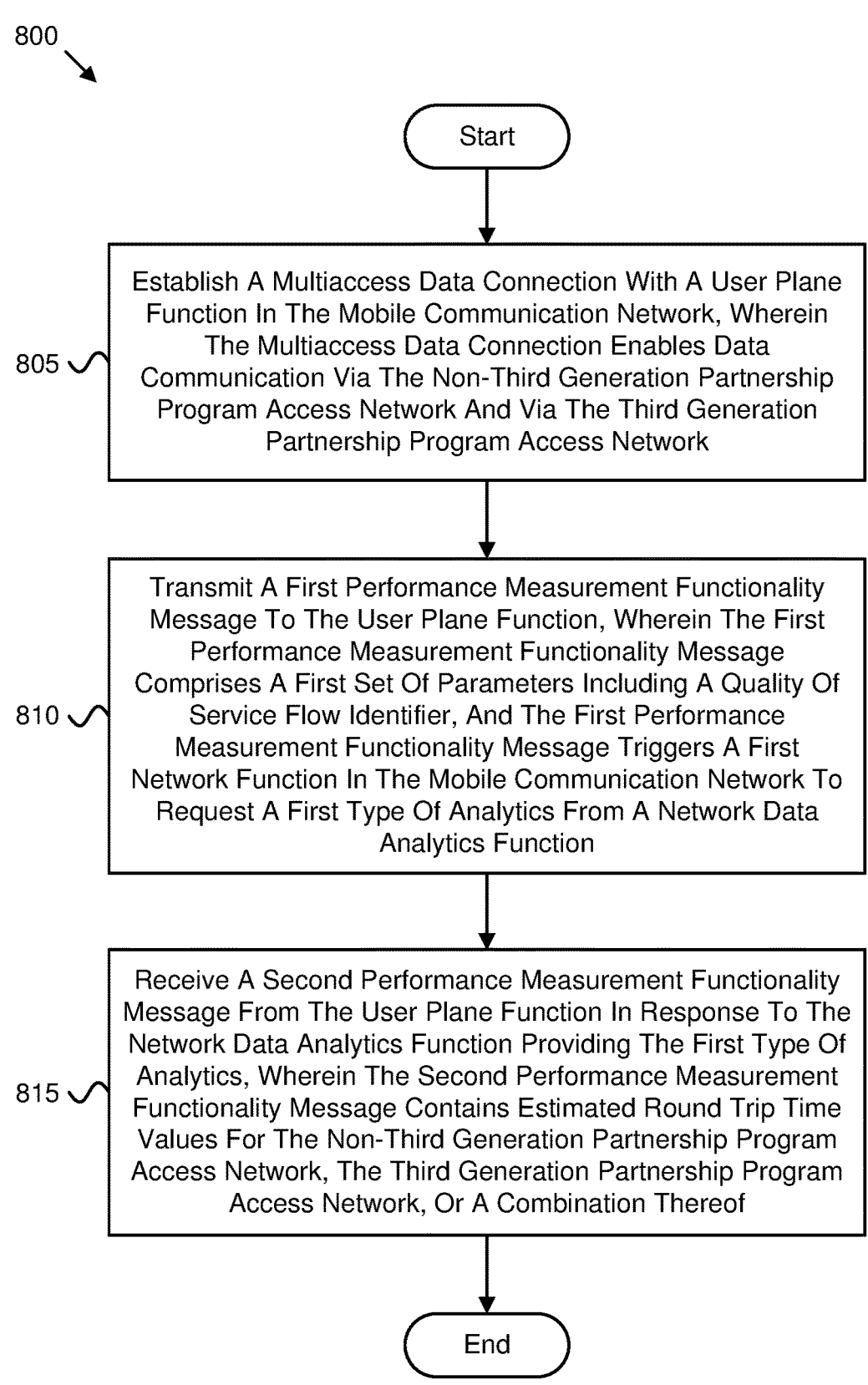

Start

805

Establish A Multiaccess Data Connection With A User Plane Function In The Mobile Communication Network, Wherein The Multiaccess Data Connection Enables Data Communication Via The Non-Third Generation Partnership Program Access Network And Via The Third Generation Partnership Program Access Network

810

Transmit A First Performance Measurement Functionality Message To The User Plane Function, Wherein The First Performance Measurement Functionality Message Comprises A First Set Of Parameters Including A Quality Of Service Flow Identifier, And The First Performance Measurement Functionality Message Triggers A First Network Function In The Mobile Communication Network To Request A First Type Of Analytics From A Network Data Analytics Function

815

Receive A Second Performance Measurement Functionality Message From The User Plane Function In Response To The Network Data Analytics Function Providing The First Type Of Analytics, Wherein The Second Performance Measurement Functionality Message Contains Estimated Round Trip Time Values For The Non-Third Generation Partnership Program Access Network, The Third Generation Partnership Program Access Network, Or A Combination Thereof End

FIG. 8

ROUND TRIP TIME DETERMINATION BASED ON ANALYTICS

The subject matter disclosed herein relates generally to wireless communications and more particularly relates to round trip time determination based on analytics.

BACKGROUND

Certain wireless systems support a feature called multi-access data connections (e.g., multi-access PDU ("MA PDU") session) between a UE and a UPF, and the policy-controlled routing of the MA PDU Session traffic over two access networks. Essentially, an MA PDU Session is a data connection between a UE and a UPF that can transfer data traffic of a service data flow ("SDF") (e.g., data traffic of an application) by using both a 3GPP access network (e.g., new radio ("NR") access or evolved universal terrestrial access ("E-UTRA") access) and a non-3GPP access network (e.g., Wi-Fi or wireline access) by applying multi-access rules (e.g., Access Traffic Steering, Switching and Splitting ("ATSSS") rules and N4 rules in the UE and in the UPF respectively) and/or port mapping. Round trip communications may take a variable amount of time in such connections.

BRIEF SUMMARY

Methods for round trip time determination based on analytics are disclosed. Apparatuses and systems also perform the functions of the methods.

One method of a user equipment ("UE") for round trip time determination based on analytics includes establishing a multiaccess data connection with a user plane function in the mobile communication network. The multiaccess data connection enables data communication via a non-third generation partnership program access network and via a third generation partnership program access network. The method includes transmitting a first performance measurement functionality message to the user plane function. The first performance measurement functionality message includes a first set of parameters including a quality of service flow identifier, and the first performance measurement functionality message triggers a first network function in the mobile communication network to request a first type of analytics from a network data analytics function. The method includes receiving a second performance measurement functionality message from the user plane function in response to the network data analytics function providing the first type of analytics. The second performance measurement functionality message contains estimated round trip time values for the non-third generation partnership program access network, the third generation partnership program access network, or a combination thereof.

One method of a first network function for round trip time determination based on analytics includes establishing a multiaccess data connection with a user equipment. The multiaccess data connection enables data communication via a non-third generation partnership program access network and via a third generation partnership program access network. The method includes receiving a first message including a first set of parameters including a quality of service flow identifier. The method includes transmitting a request a first type of analytics to a network data analytics function in response to receiving the first message. The method includes, in response to transmitting the request for the first type of analytics, receiving estimated round trip time values for the non-third generation partnership program access network, the third generation partnership program access network, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flow chart diagram illustrating one embodiment of a first method for round trip time determination based on analytics.

DETAILED DESCRIPTION

Figure 1:
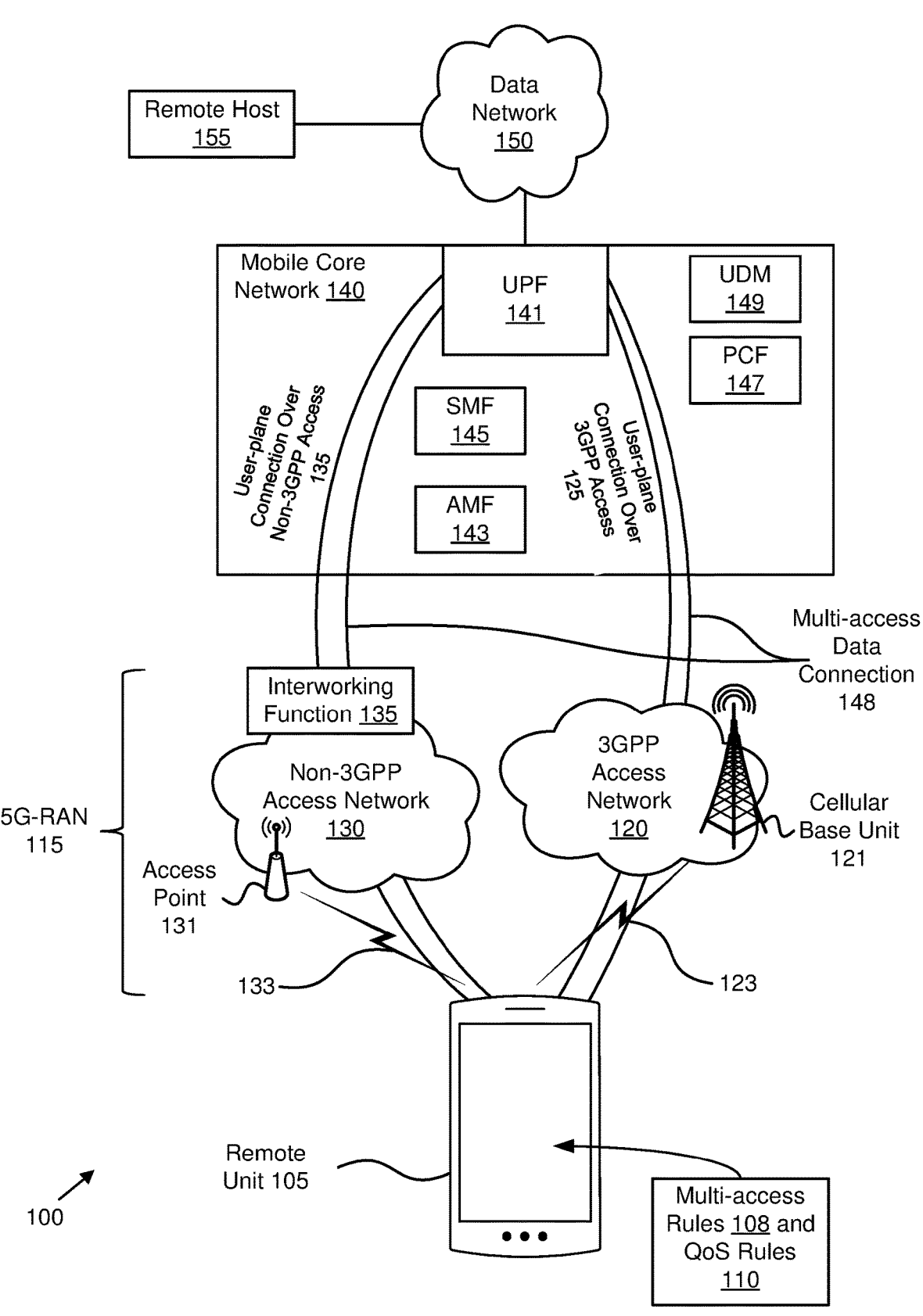
FIG. 1 is a diagram illustrating one embodiment of a wireless communication system for round trip time determination based on analytics.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for round trip time determination based on analytics.

In certain configurations, a UE capable of supporting Access Traffic Steering, Switching, Splitting ("ATSSS"), may simultaneously communicate over a 3GPP access network (e.g., NG-RAN) and over a non-3GPP access network (e.g., wide local access network ("WLAN")). In such configurations, the traffic exchanged between a UE and a remote host may either be distributed over both accesses, or may be sent on a best access only (e.g., on an access characterized by less latency), or a less Round Trip Time ("RTT"). In an uplink ("UL") direction, the UE may decide how to distribute the traffic across the two accesses based on policy rules (e.g., ATSSS rules) provided by the network. Similarly, in a downlink ("DL") direction, a UPF at the edge of the 5G Core ("5GC") network decides how to distribute the traffic across the two accesses based on corresponding policy rules (e.g., N4 rules).

In some embodiments, if communication latency is important, policy rules may indicate that specific traffic should be routed according to a latency-dependent condition. For example, the policy rules in a UE may indicate: 1) traffic of App-X may be routed over 3GPP access if latency over 3GPP access <20 ms; or 2) internet protocol ("IP") multimedia services ("IMS") voice traffic may be routed to an access with a smallest Latency.

To enforce the above policy rules, a UE may be required to measure a latency (or RTT) over 3GPP access and the latency (or RTT) over non-3GPP access. Similarly, the UPF may be required to measure the latency (or RTT) over 3GPP access and the latency (or RTT) over non-3GPP access to decide how to route the DL traffic to comply with the policy rules.

In various embodiments, a Performance Measurement Functionality ("PMF") may be supported in a UE and in a UPF (e.g., which assists in taking real-time RTT measurements over the two accesses). In particular, RTT measurements may be taken by exchanging PMF-Echo Request and/or PMF-Echo Response messages between a PMF function in the UE (UE-PMF) and the PMF function in the UPF (UPF-PMF). Thus, the UE may calculate a RTT over each access, which is associated with the latency of each access. However, sending frequent PMF-Echo Request and/or Response messages (e.g., once every 5-10 sec) between the UE and UPF, and over UDP and/or IP may be inefficient since it uses a lot of overhead and consumes a lot of radio, network, and battery resources. Furthermore, it may create additional traffic, which may increase congestion and may result to much higher latency values.

In certain embodiments, there may be methods for estimating a RTT in a UE and in a UPF that does not require the exchange of real-time measurement messages between the UE and the UPF and, thus, may improve efficiency of RTT estimations for each access type. As described herein, different embodiments use RTT analytics information provided by a Network Data Analytics Function ("NWDAF").

FIG. 1 depicts a wireless communication system 100 for round trip time determination based on analytics, according to embodiments of the disclosure. In one embodiment, the wireless communication system 100 includes at least one remote unit 105 (having multi-access rules 108 and QoS rules 110), a fifth-generation radio access network ("5G-RAN") 115, and a mobile core network 140. The 5G-RAN 115 and the mobile core network 140 form a mobile communication network. The 5G-RAN 115 may be composed of a third generation partnership program ("3GPP") access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of local units 102, 103, remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, long term evolution ("LTE") or worldwide interoperability for microwave access ("WiMAX"), among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host 155 via a network connection with the mobile core network 140. For example, an application in a remote unit 105 (e.g., web browser, media client, telephone/VoIP application) may trigger the remote unit 105 to establish a PDU session (or other data connection (e.g., multi-access data connection 148)) with the mobile core network 140 using the 5G-RAN 115 (e.g., a 3GPP access network 120 and/or a non-3GPP access network 130). The mobile core network 140 then relays traffic between the remote unit 105 and the data network 150 (e.g., remote host 155) using the PDU session. Note that the remote unit 105 may establish one or more PDU sessions (or other data connections) with the mobile core network 140. As such, the remote unit 105 may have at least one PDU session for communicating with the data network 150. The remote unit 105 May establish additional PDU sessions for communicating with other data network and/or other remote hosts.

Moreover, the remote unit 105 may establish a multi-access PDU session (i.e., multi-access data connection) with the mobile core network 140 whereby traffic of the multi-access PDU session is steered over one or both of the 3GPP access network 120 and/or a non-3GPP access network 130, according to steering rules. Additionally, a user-plane connection over 3GPP access 125 may be established over the 3GPP access network 120 for transferring traffic of the multi-access PDU session. Similarly, a user-plane connection over non-3GPP access 135 may be established over the non-3GPP access network 130 for handling traffic of the multi-access PDU session. Accordingly, the remote unit 105 may be configured with multi-access rules 108 and QoS rules 110 for determining QoS data flows for performing measurements.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the remote unit 105 and the mobile core network 140. In some embodiments, the interworking function 135 is a Non-3GPP Interworking Function ("N3IWF") and, in other embodiments, it is a Trusted Non-3GPP Gateway Function ("TNGF"). The N3IWF supports the connection of "untrusted" non-3GPP access networks to the mobile core network (e.g., 5GC), whereas the TNGF supports the connection of "trusted" non-3GPP access networks to the mobile core network. The interworking function 135 supports connectivity to the mobile core network 140 via the "N2" and "N3" interfaces, and it relays "N1" signaling between the remote unit 105 and the AMF 143. Both the 3GPP access network 120 and the interworking function 135 communicate with the AMF 143 using a "N2" interface. The interworking function 135 also communicates with the UPF 141 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least a UPF 141 that serves the 3GPP access network 120 and the non-3GPP access network 130. Note that in certain embodiments, the mobile core network may contain one or more intermediate UPFs, for example a first intermediate UPF that serves the non-3GPP access network 130 and the second intermediate UPF that serves the 3GPP access network 120. In such embodiments, the UPF 141 would be an anchor UPF receiving UP traffic of both intermediate UPFs.

The mobile core network 140 also includes multiple control plane functions including, but not limited to, an Access and Mobility Management Function ("AMF") 143 that serves both the 3GPP access network 120 and the non-3GPP access network 130, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over application programming interfaces ("APIs")), or other NFs defined for the 5GC. In various embodiments, the mobile core network 140 may include a PMF (not shown) to assist the remote unit 105 and/or the UPF 141 in taking performance measurements over the two accesses, including latency measurements. In one embodiment, the PMF may be co-located with the UPF 141.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each slice may be identified using a single network slice selection assistance information ("S-NSSAI"). In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 20) 1, one of skill in the art will recognize that any number and type of network functions may be included in the mobile core network 140. Moreover, where the mobile core network 140 is an EPC, the depicted network functions may be replaced with appropriate EPC entities, such as a mobility management entity ("MME"), secondary ("S") gateway ("GW") ("S-GW"), primary ("P") GW ("P-GW"), home subscriber server ("HSS"), and the like.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., next generation radio access network ("NG-RAN")) and the second type of access (e.g., non-3GPP access network 130)

unit 105 (e.g., UE) and are applied for determining a smallest-delay access type, or evaluating RTT thresholds, and so forth.

In a first embodiment (e.g., embodiment A), RTT analytics from an NWDAF are requested by an SMF. If a UE does not provide its location to the SMF (e.g., via the UPF), then the SMF determines the UE location (e.g., by creating a mobility subscription with the AMF serving the UE and receiving location_update event reports from the AMF) if the UE changes cells or changes Wi-Fi access point ("AP").

In a second embodiment (e.g., embodiment B), RTT analytics from an NWDAF are requested by a UPF. If the UE does not provide its location to the UPF, then the UPF determines the UE location (e.g., by creating a mobility subscription with the AMF serving the UE and receiving location_update event reports from the AMF) if the UE changes cells or Wi-Fi AP.

FIGS. 2A, 2B, 3, 4A, 4B, and 5 may be applied to the first embodiment and/or the second embodiment.

Figure 2A:
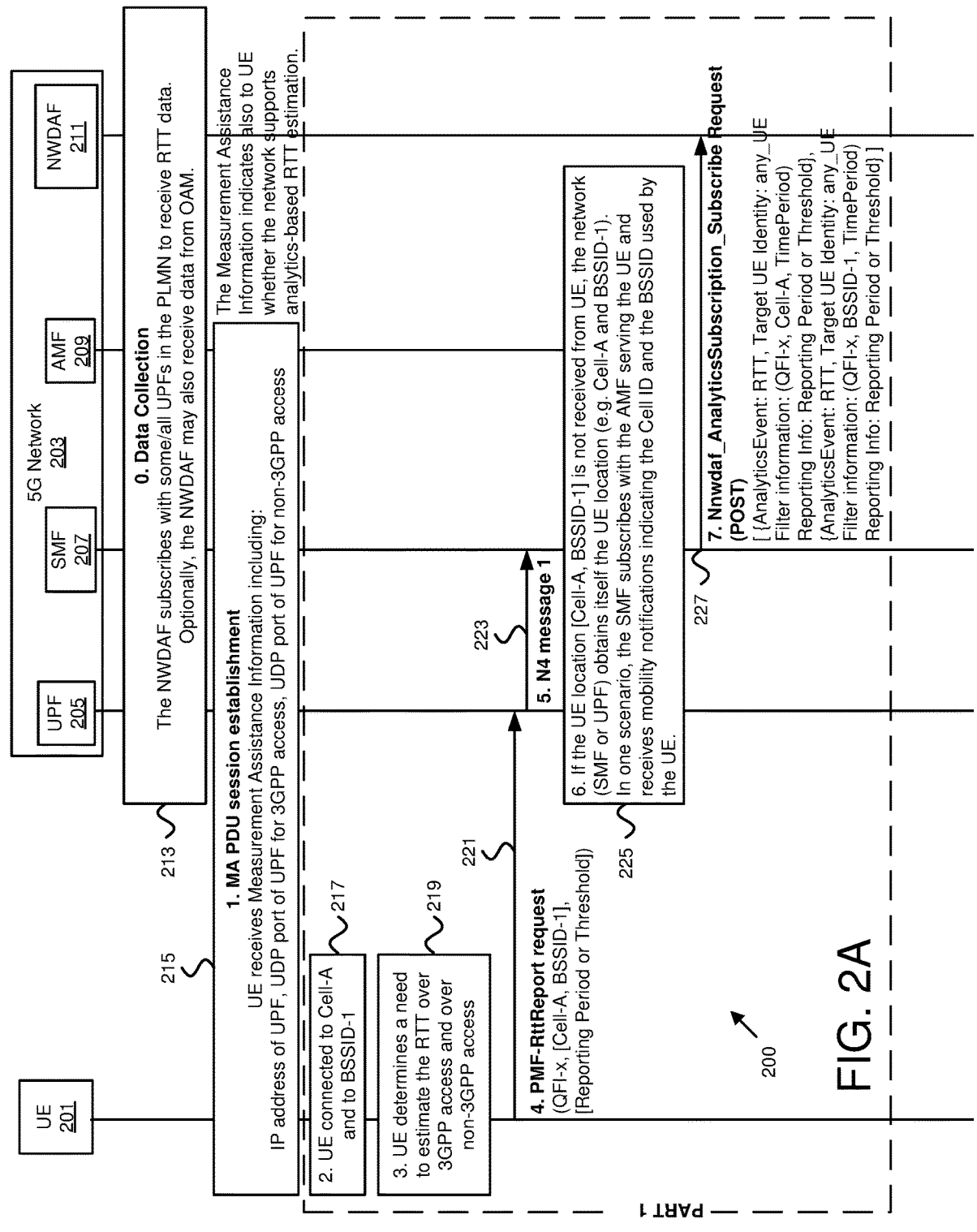
FIGS. 2A and 2B are a signal flow diagram illustrating one embodiment of a procedure for round trip time determination based on analytics.
Figure 2B:
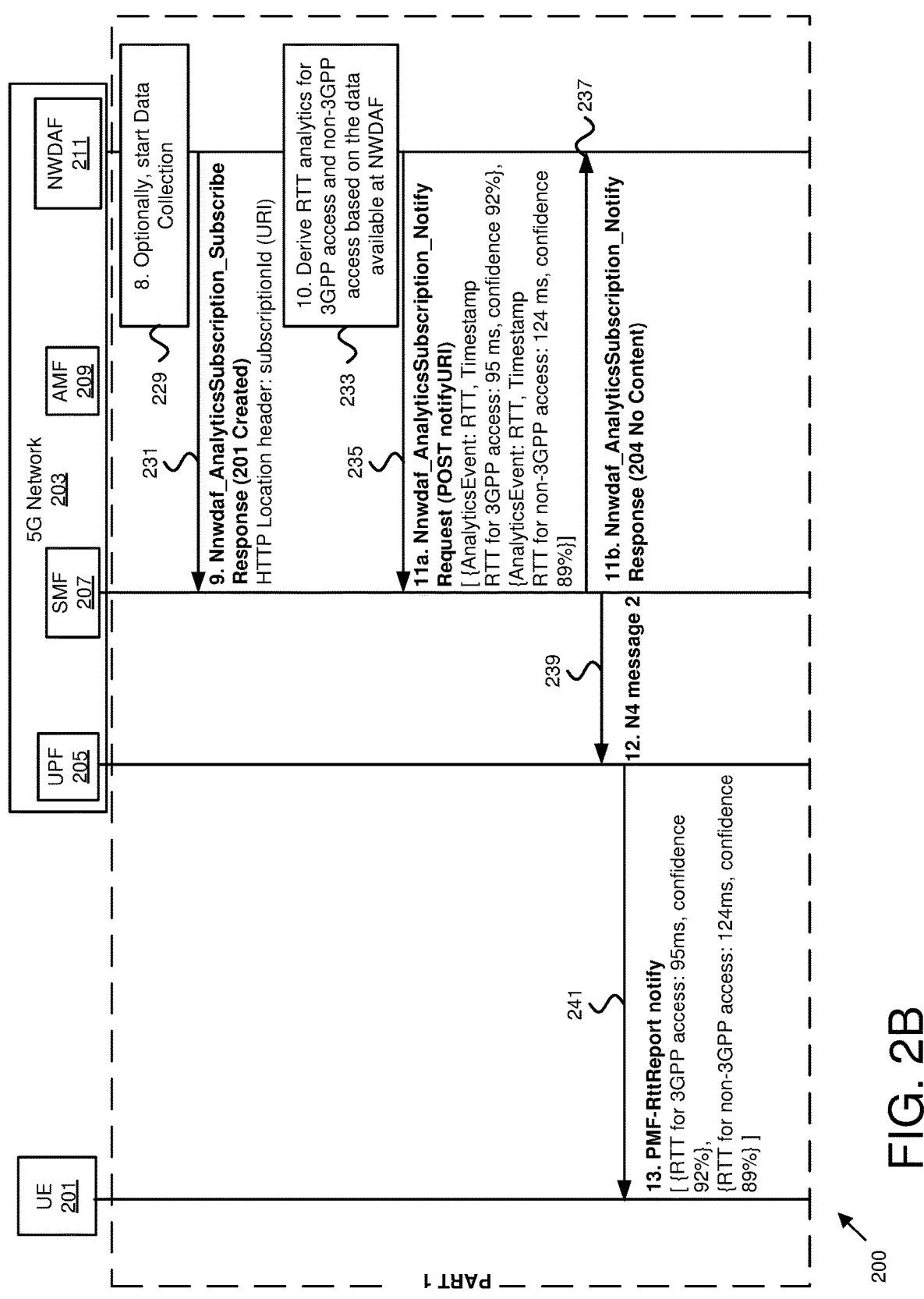

FIGS. 2A and 2B depict a procedure 200 including part 1 for round trip time determination based on analytics, according to embodiments of the disclosure. The procedure 200 involves a UE 201 (e.g., one embodiment of the remote unit 105) and a 5G network 203. The 5G network 203 includes a UPF 205, an SMF 207, an AMF 209, and an NWDAF 211.

In FIG. 2A Step 0, the NWDAF 211 collects 213 data (e.g., see Table 1 for some examples) from several network functions in the mobile communication network, including operations, administration, and maintenance ("OAM"), application functions ("AFs"), UPFs, AMFs, and so forth. The data collected at the NWDAF 211 may have a structure (e.g., see Table 1) and may be used for deriving RTT analytics for a specific access type, quality of service ("QoS") flow, location, and time period. The RTT analytics may be used to predict the RTT that will be experienced if data is transmitted in a certain 3GPP cell or non-3GPP AP at a certain time period and via a certain QoS flow.

TABLE 1

| | | | Data Collected at NWDAF | | | | |
|---|---|---|---|---|---|---|---|
| Date | Day | Start | End | Location | QFI | RTT | RTT deviation |
| June 12 | Monday | 1:12pm | 1:16pm | Cell A | 5QI-a | 123 ms | 12.57 ms |
| June 16 | Friday | 2:23pm | 2:27pm | Cell B | 5QI-b | 67 ms | 9.88 ms |
| June 20 | Tuesday | 10:02am | 10:33am | BSSID-1 | 5QI-c | 88.23 ms | 10.52 ms |
| June 20 | Tuesday | 10:13am | 10:24am | BSSID-2 | 5QI-d | 95.23 ms | 11.63 ms | uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

The remote unit 105 may estimate a RTT over each user-plane path to transmit data to the remote host 155 via an access type with the smallest-delay. As described herein, the remote unit 105 estimates a RTT over each user-plane path by using RTT analytics provided by an NWDAF.

In some embodiments, a remote unit 105 (e.g., UE) sends a new PMF request message to a UPF which triggers a network (e.g., either the UPF or the SMF) to request RTT analytics from an NWDAF valid at the present UE location and in a certain time period. The RTT analytics provided by the NWDAF contains a predicted RTT for each access type and is derived by the NWDAF based on historical RTT measurements available in the NWDAF. The predicted RTT values in the RTT analytics are then sent back to the remote In Step 1, the UE 201 establishes 215 a MA PDU session. A PDU Session establishment accept message received by the UE 201 contains Measurement Assistance Information, which may include an IP address and user datagram protocol ("UDP") ports (one for each access type) for which the UE 201 should send PMF messages. The Measurement Assistance Information may also indicate to the UE 201 whether the network supports analytics-based RTT estimation.

In Part 1, the UE 201 requests and receives RTT analytics from the network.

In Step 2, the UE 201 connects 217 to Cell-A over 3GPP access and to a basic service set identifier ("BSSID") 1 ("BSSID-1") over non-3GPP access (e.g., Wi-Fi).

In Step 3, the UE 201 determines 219 that it should estimate a RTT over 3GPP access and over non-3GPP access. This may be determined if the UE 201 needs to apply an ATSSS rule that requires traffic steering based on a smallest-delay steering policy.

In Step 4, since the UE 201 knows that the network supports analytics-based RTT estimation, the UE 201 requests 221 from the network to provide RTT estimations for its present location. In particular, the UE 201 sends a PMF-RttReport request message over 3GPP or over non-3GPP access including: 1) the identity of the QoS flow ("QFI") for which RTT estimations are needed; 2) optionally, its present cell identity (Cell-A) and Wi-Fi AP identity (BSSID-1); and 3) an indication of whether the RTT reports should be provided periodically or if a threshold condition is met.

In Step 5, a conditional step required in the first embodiment, where the SMF 207 requests the RTT analytics from the NWDAF 211. The UPF 205 forwards 223 the UE's 201 request for RTT reports to the SMF 207 by sending a message over the N4 interface (N4 message 1).

In Step 6, if the UE 201 location (Cell-A, BSSID-1) is not provided by the UE 201 in Step 4, the network (SMF 207 or UPF 205) obtains 225 itself the UE 201 location. In one scenario applicable to embodiment A, the SMF 207 subscribes to the AMF 209 serving the UE 201 and receives mobility notifications indicating the Cell ID and the BSSID used by the UE 201. In another scenario applicable to embodiment B, the UPF 205 subscribes to the AMF 209 serving the UE 201 and receives mobility notifications indicating the Cell ID and the BSSID used by the UE 201.

In Step 7, the SMF 207 (in embodiment A) or the UPF 205 (in embodiment B) sends 227 a subscription request message to NWDAF 211, which requests from NWDAF 211 (a) to provide RTT analytics for the present cell of the UE 201 (Cell-A) and (b) to provide RTT analytics for the present Wi-Fi AP of the UE 201 (BSSID-1). The subscription request message indicates also the QFI for which analytics are requested and may include a Time Period for which the RTT analytics should be valid. In addition, it may contain reporting information indicating when the RTT analytics should be reported (e.g., periodically or when a threshold condition is met).

Turning to FIG. 2B, in Step 8, if the NWDAF 211 has not already collected data to be used for RTT analytics, the NWDAF 211 initiates 229 a data collection procedure.

In Step 9, the NWDAF 211 responds 231 to the SMF 207 or the UPF 205 with a response message acknowledging the creation of the requested subscription.

In Step 10, the NWDAF 211 derives 233 the requested RTT analytics based on the collected data available in the NWDAF 211.

In Step 11a, if the requested RTT analytics are available, the NWDAF 211 provides 235 the RTT analytics by sending a notify request message to the SMF 207 or the UPF 205. As an example, the notify request message may indicate that the estimated RTT over 3GPP access is 95 ms with confidence 92%, and the estimated RTT over non-3GPP access is 124 ms with confidence 89%. In Step 11b, the SMF 207 or the UPF 205 acknowledges 237 the reception of the notify message.

In Step 12, a conditional step required in embodiment A, the SMF 207 requests the RTT analytics from the NWDAF 211. The SMF 207 forwards 239 to the UPF 205 the RTT analytics received from the NWDAF 211 by sending a message 2 over the N4 interface.

In Step 13, the UPF 205 sends 241 to the UE 201 a PMF-RttReport notify message containing the estimated RTT values for the two accesses. This message may also contain the confidence received by the NWDAF 211, although this confidence may not be used by the UE 201. Based on the received RTT values, the UE 201 identifies the access that provides the smallest delay at the present UE 201 location and time. It then steers the relevant traffic over this access.

In Part 2, the UE 201 receives updated and/or fresh RTT analytics from the network while it remains in the same cell and Wi-Fi AP.

Figure 3:
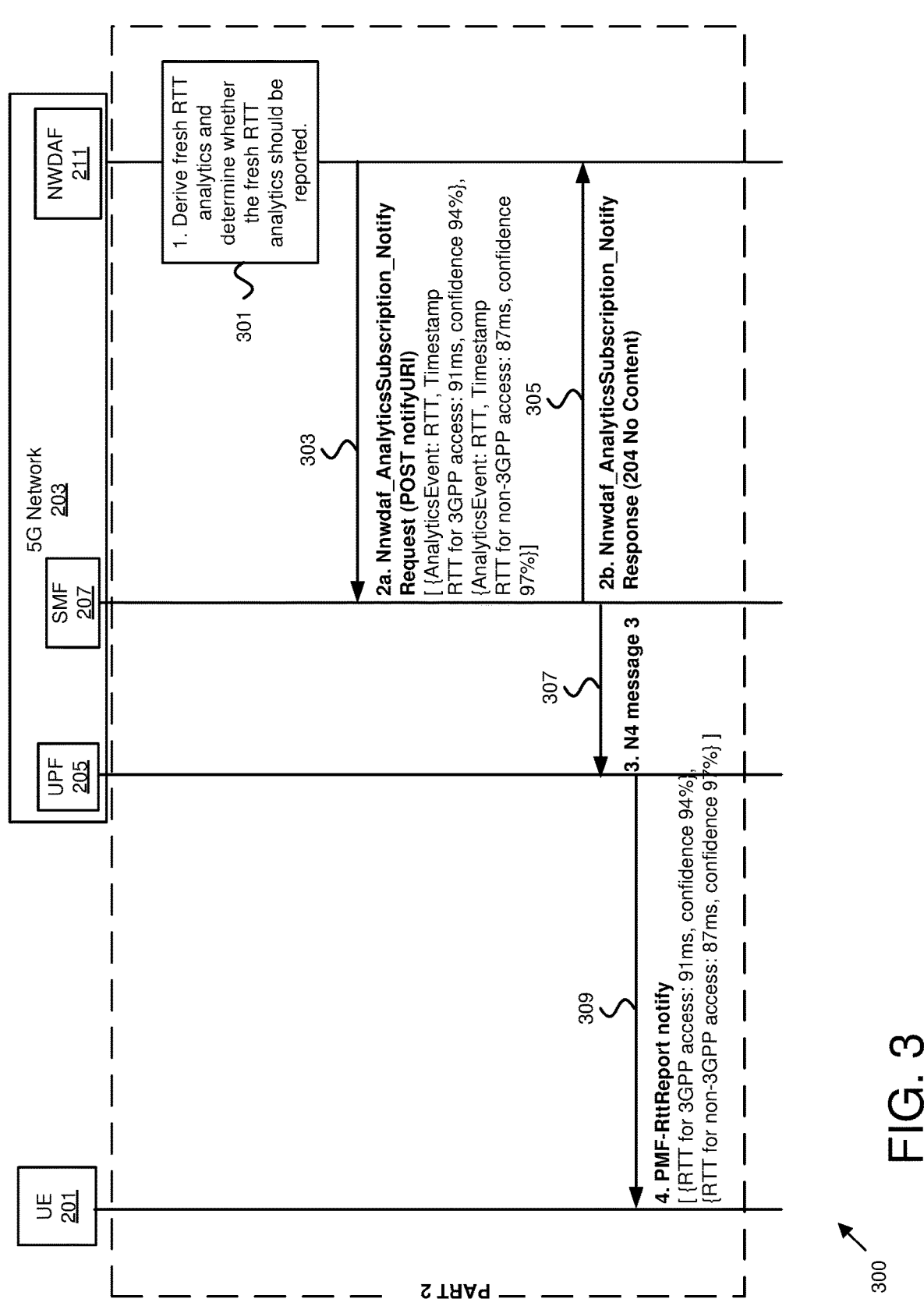
FIG. 3 is a signal flow diagram illustrating another embodiment of round trip time determination based on analytics.

FIG. 3 depicts a procedure 300 including part 2 for round trip time determination based on analytics, according to embodiments of the disclosure. The procedure 300 involves the UE 201 (e.g., one embodiment of the remote unit 105) and the 5G network 203. The 5G network 203 includes the UPF 205, the SMF 207, and the NWDAF 211.

In Step 1, the NWDAF 211 determines 301 that fresh RTT analytics should be provided (e.g., because a reporting period has expired, or a threshold condition has been met). A threshold condition may indicate that fresh RTT analytics should be provided when the estimated RTT over 3GPP access changes by 10%, the estimated RTT over 3GPP access exceeds 100 ms, or the estimated RTT over 3GPP access exceeds the estimated RTT over non-3GPP access, for example.

In Step 2a, the NWDAF 211 provides 303 the fresh RTT analytics by sending a notify request message to the SMF 207 or the UPF 205. As an example, the notify request message may indicate that the new estimated RTT over 3GPP access is 91 ms with confidence 94%, and the estimated RTT over non-3GPP access is 87 ms with confidence 97%. In Step 2b, the SMF 207 or the UPF 205 acknowledges 305 the reception of the notify message.

In Step 3, a conditional step may be required in embodiment A, the SMF 207 requests 307 the RTT analytics from the NWDAF 211. The SMF 207 forwards to the UPF 205 the fresh RTT analytics received from the NWDAF 211 by sending a message 3 over the N4 interface.

In Step 4, the UPF 205 sends 309 to the UE 201 a new PMF-RttReport notify message containing the estimated fresh RTT values for the two accesses. This message may also contain the confidence received by the NWDAF 211, although this confidence may not be used by the UE 201. The UE 201 adjusts its steering operation based on the received fresh RTT values.

In Part 3, the UE 201 receives updated and/or fresh RTT analytics from the network if it moves to a new cell or Wi-Fi AP.

Figure 4A:
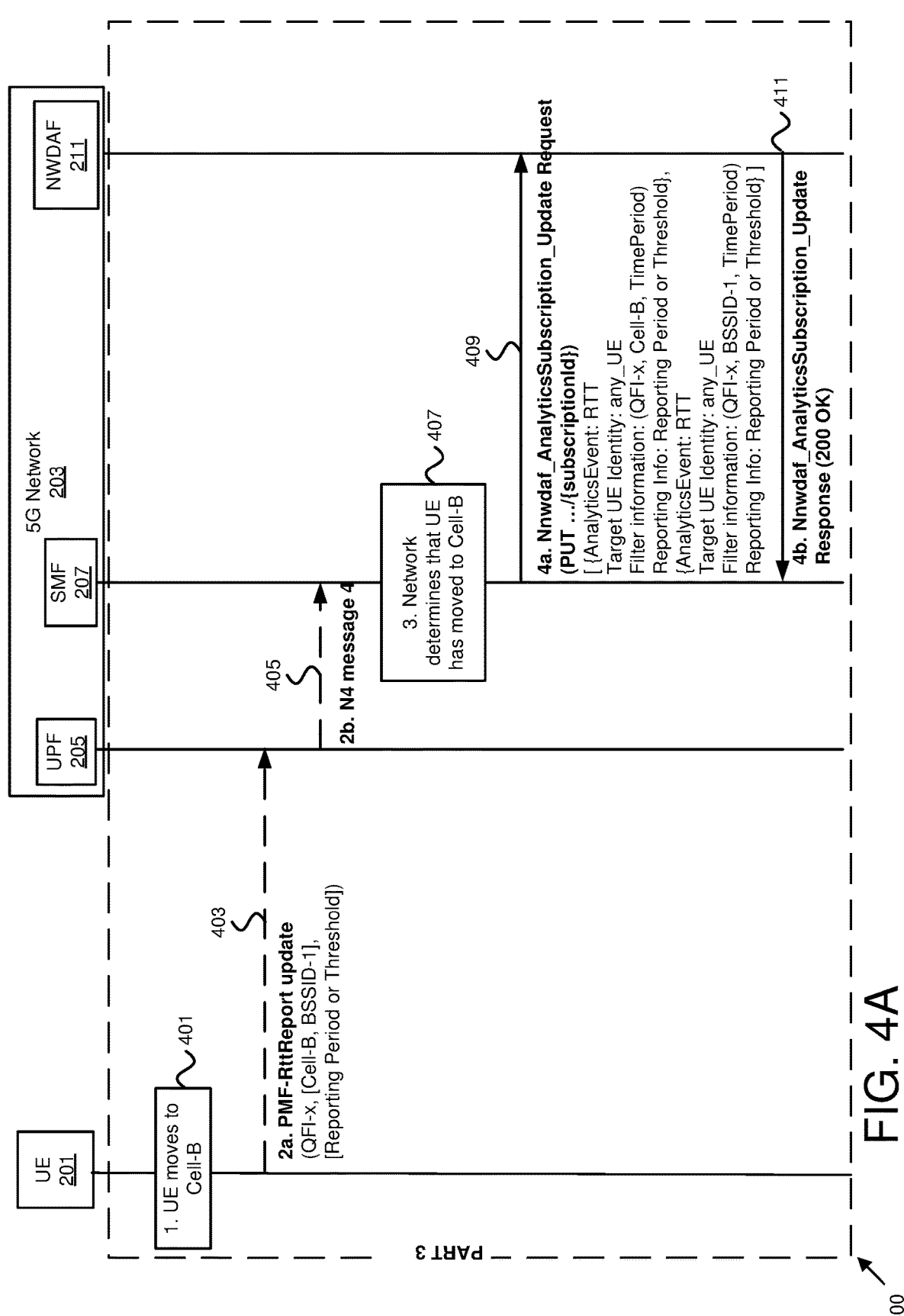
FIGS. 4A and 4B are a signal flow diagram illustrating a further embodiment of round trip time determination based on analytics.
Figure 4B:
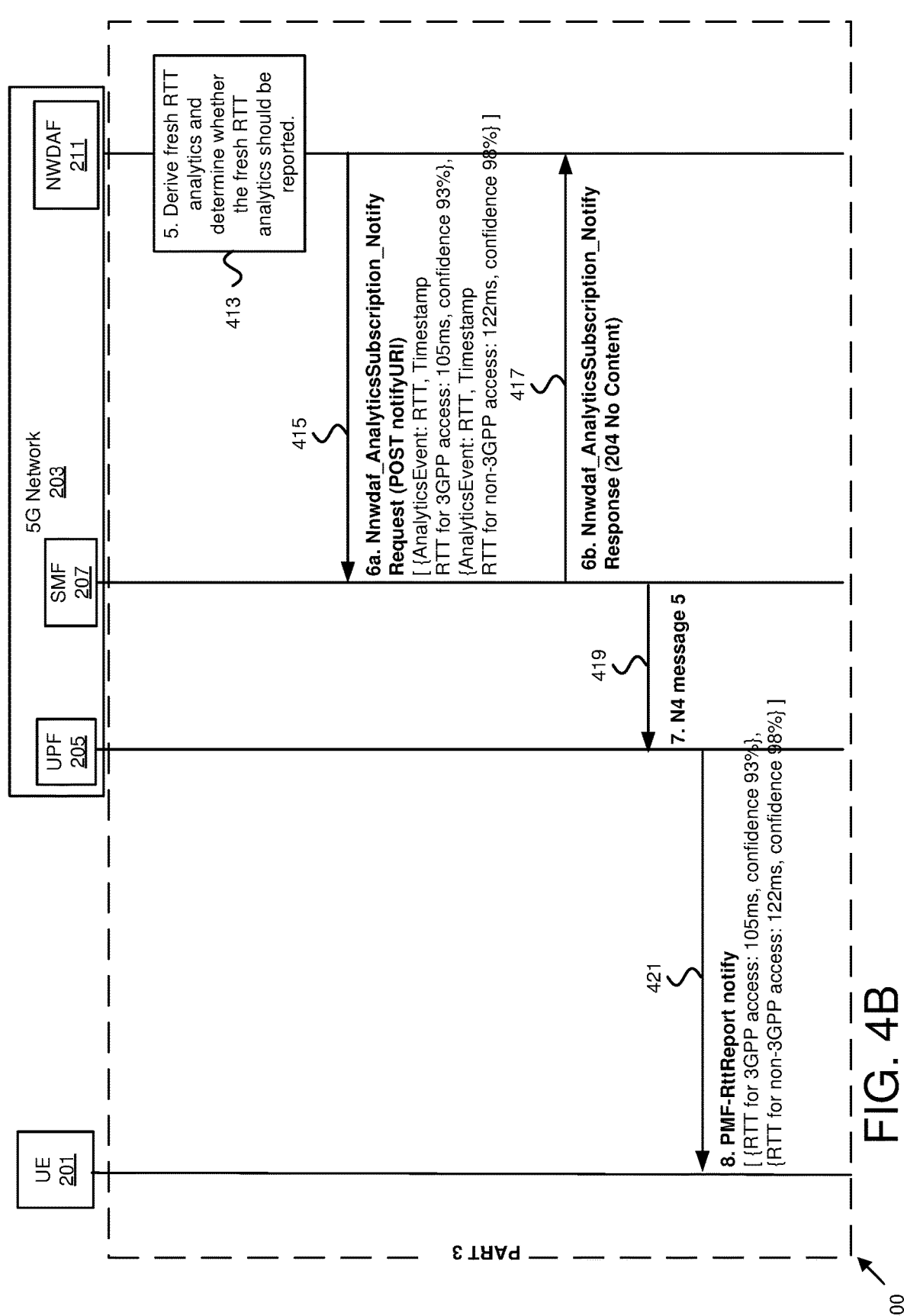

FIGS. 4A and 4B depict a procedure 400 including part 3 for round trip time determination based on analytics, according to embodiments of the disclosure. The procedure 400 involves the UE 201 (e.g., one embodiment of the remote unit 105) and the 5G network 203. The 5G network 203 includes the UPF 205, the SMF 207, and the NWDAF 211.

In FIG. 4A Step 1, the UE 201 moves 401 to a new cell (e.g., Cell-B).

In Step 2, a conditional step required if the UE 201 provides its location to the network. It is not required if the UE 201 location is determined by the network. In Step 2a, the UE 201 sends 403 a new PMF-RttReport request message including its new location (e.g., [Cell-B, BSSID-1]). In Step 2b and in embodiment A where the SMF 207 requests the RTT analytics from the NWDAF 211, the UPF 205 sends 405 an N4 message 4 to the SMF 207 to provide the new location of the UE 201.

In Step 3, if the UE 201 location is not provided by the UE 201 (as in the previous step), the network itself determines 407 the new location of the UE 201. In one scenario applicable to embodiment A, the SMF 207 receives a location_update event report from the AMF indicating the new Cell ID and/or the new BSSID used by the UE 201. In another scenario applicable to embodiment B, the UPF 205 receives a location_update event report from the AMF indicating the new Cell ID and/or the new BSSID used by the UE 201.

In Step 4a, the SMF 207 (in embodiment A) or the UPF 205 (in embodiment B) updates 409 the created subscription in the NWDAF 211 by sending an update request message that contains the new Cell ID (Cell-B) and BSSID of the UE 201. In Step 4b, the NWDAF 211 responds 411 to the SMF 207 or the UPF 205 with a response message acknowledging the update of the subscription.

Turning to FIG. 4B Step 5, the NWDAF 211 derives 413 fresh RTT analytics based on the new location of the UE 201 and the collected data available in the NWDAF 211.

In Step 6a, if the requested RTT analytics are available, the NWDAF 211 provides 415 the RTT analytics by sending a notify request message to the SMF 207 or the UPF 205. In Step 6b, the SMF 207 or the UPF 205 acknowledges 417 the reception of the notify message.

In Step 7, a conditional step required in embodiment A, the SMF 207 requests the RTT analytics from the NWDAF 211. The SMF 207 forwards 419 to the UPF 205 the fresh RTT analytics received from the NWDAF 211 by sending a message 5 over the N4 interface.

In Step 8, the UPF 205 sends 421 to the UE 201 a PMF-RttReport notify message containing the estimated fresh RTT values for the two accesses. The UE 201 adjusts its steering operation based on the received fresh RTT values.

In Part 4, the UE 201 stops receiving RTT analytics when one access becomes unavailable in the UE 201.

Figure 5:
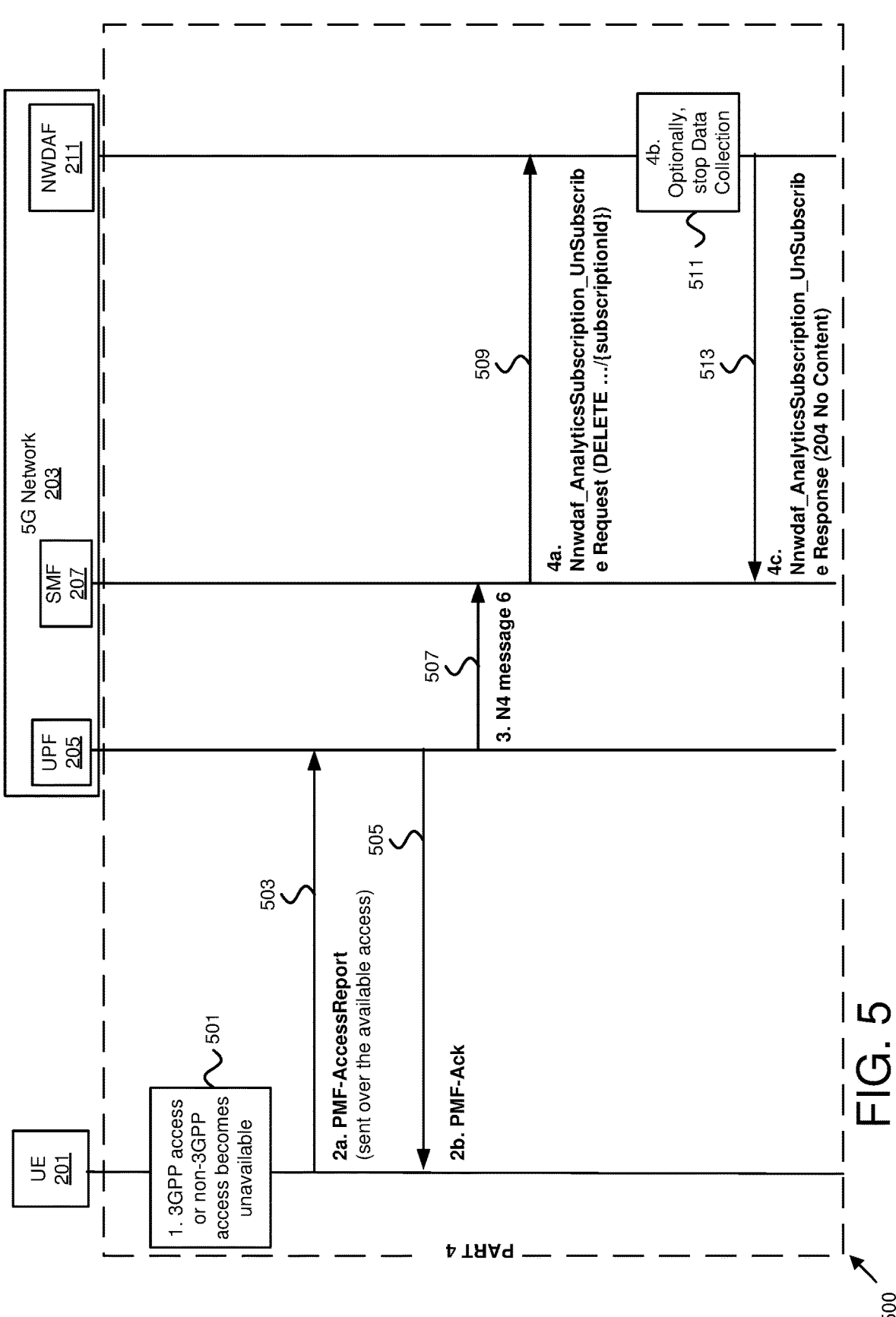
FIG. 5 is a signal flow diagram illustrating yet another embodiment of round trip time determination based on analytics.

FIG. 5 depicts a procedure 500 including part 4 for round trip time determination based on analytics, according to embodiments of the disclosure. The procedure 500 involves the UE 201 (e.g., one embodiment of the remote unit 105) and the 5G network 203. The 5G network 203 includes the UPF 205, the SMF 207, and the NWDAF 211.

In Step 1, one of the two accesses becomes unavailable 501 in the UE 201. This may occur if the UE 201 loses the 3GPP signal or the non-3GPP signal.

In Step 2a, the UE 201 reports 503 the unavailability of the access by sending a PMF-AccessReport to the UPF 205 via the available access. In Step 2b, the UPF 205 responds 505 with a PMF-Ack message.

In Step 3, a conditional step required in embodiment A, the SMF 207 requests the RTT analytics from the NWDAF 211. The UPF 205 indicates 507 to the SMF 207 that one access has become unavailable in the UE 201.

In Step 4a, the SMF 207 (in embodiment A) or the UPF 205 (in embodiment B) sends 509 a message to the NWDAF 211 to delete a created RTT analytics subscription. The NWDAF 211 deletes this subscription and provides a response message. Optionally, in Step 4b, the NWDAF 211 may stop collecting 511 data for RTT analytics derivation. After this step, the UE 201 does not receive further RTT analytics because the UE 201 has only one access available and cannot use RTT information for determining how to route uplink data traffic. In Step 4c, the NWDAF 211 sends a response message.

Figure 6:
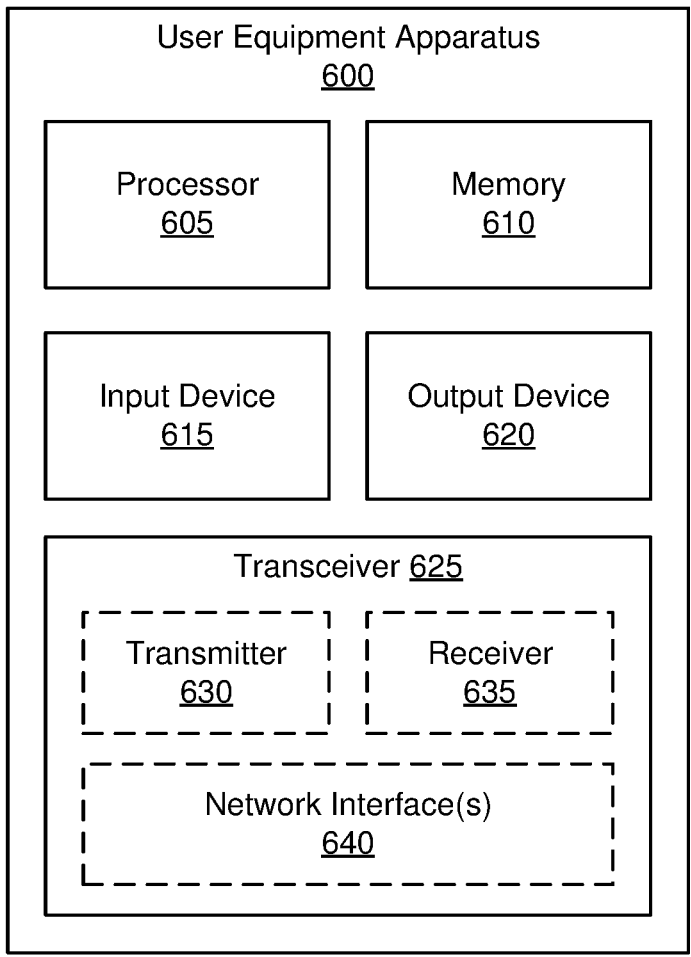
FIG. 6 is a block diagram illustrating one embodiment of a user equipment apparatus for round trip time determination based on analytics.

FIG. 6 depicts one embodiment of a user equipment apparatus 600 that may be used for round trip time determination based on analytics, according to embodiments of the disclosure. The user equipment apparatus 600 may be one embodiment of the remote unit 105 and/or the UE 201. Furthermore, the user equipment apparatus 600 may include a processor 605, a memory 610, an input device 615, an output device 620, a transceiver 625. In some embodiments, the input device 615 and the output device 620 are combined into a single device, such as a touch screen. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 5GC) via one or more access networks. Additionally, the transceiver 625 may support at least one network interface 640. Here, the at least one network interface 640 facilitates communication with an eNB or gNB (e.g., using the "Uu" interface). Additionally, the at least one network interface 640 may include an interface used for communications with an AMF, an SMF, and/or a UPF.

In some embodiments, the transceiver 625 comprises a first transceiver that communicates with a mobile communication network via a first access network and a second transceiver that communicates with the mobile communication network via a second access network. In other embodiments, the transceiver 625 comprises a first functionality (e.g., modem) for communicating with the mobile communication network via the first access network and a second functionality (e.g., modem) for communicating with the mobile communication network via the second access network.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 establishes a multiaccess data connection with a user plane function in a mobile communication network. The multiaccess data connection enables data communication via a non-third generation partnership program access network and via a third generation partnership program access network.

The transmitter 630 transmits a first performance measurement functionality message to the user plane function. The first performance measurement functionality message includes a first set of parameters including a quality of service flow identifier, and the first performance measurement functionality message triggers a first network function in the mobile communication network to request a first type of analytics from a network data analytics function.

The receiver 635 receives a second performance measurement functionality message from the user plane function in response to the network data analytics function providing the first type of analytics. The second performance measurement functionality message contains estimated round trip time values for the non-third generation partnership program access network and/or the third generation partnership program access network.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to round trip time determination based on analytics, for example storing access network information ("ANI"), IP addresses, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touch-screen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, a liquid crystal display ("LCD") display, an LED display, an organic light emitting diode ("OLED") display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notifi-cation (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communi-cation network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter (s) 630 and the receiver(s) 635 may be any suitable type of transmitters and receivers. In one embodiment, the trans-ceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile commu-nication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network inter-face 640.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hard-ware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically config-ured as a transceiver 625 that uses one more common control signals or as modular transmitters 630 and receivers 635 implemented in the same hardware chip or in a multi-chip module.

Figure 7:
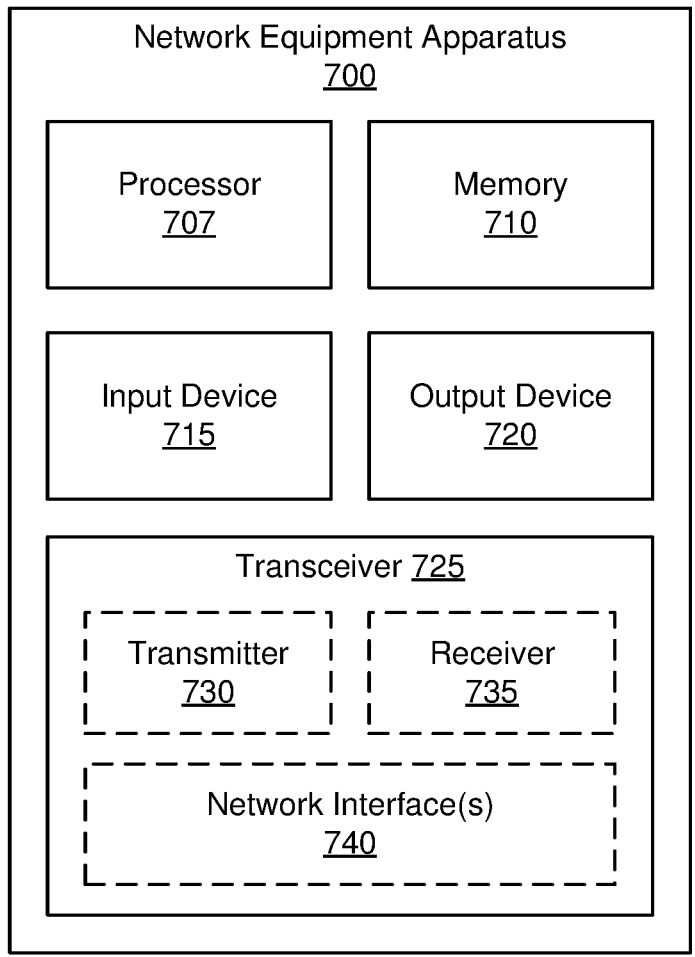
FIG. 7 is a block diagram illustrating one embodiment of a network equipment apparatus for round trip time determination based on analytics.

FIG. 7 depicts one embodiment of a network equipment apparatus 700 that may be used for round trip time deter-mination based on analytics, according to embodiments of the disclosure. In some embodiments, the network equip-ment apparatus 700 may implement a UPF. In other embodi-ments, the network equipment apparatus 700 may imple-ment other network functions. Furthermore, network equipment apparatus 700 may include a processor 705, a memory 710, an input device 715, an output device 720, a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740. In some embodiments, the transceiver 725 supports a first interface for communicating with a RAN node, a second interface for communicating with one or more network functions in a mobile core network (e.g., a 5GC) and a third interface for communi-cating with a remote unit (e.g., UE).

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the first transceiver 725.

In various embodiments, the network equipment apparatus 700 operates as a first network function. In such embodiments, the processor 705 establishes a multiaccess data connection with a user equipment. The multiaccess data connection enables data communication via a non-third generation partnership program access network and via a third generation partnership program access network.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to round trip time determination based on analytics, for example storing ANI, IP addresses, UE contexts, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more interworking functions that provide access to one or more PLMNs. The transceiver 725 may also communicate with one or more network functions (e.g., in the mobile core network 140). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

In one embodiment, the receiver 735 receives a first message includes a first set of parameters including a quality of service flow identifier. In some embodiments, the transmitter 730 transmits a request a first type of analytics to a network data analytics function in response to receiving the first message. In certain embodiments, in response to transmitting the request for the first type of analytics, the receiver 735 receives estimated round trip time values for the non-third generation partnership program access network and/or the third generation partnership program access network.

FIG. 8 depicts a method 800 for round trip time determination based on analytics, according to embodiments of the disclosure. In some embodiments, the method 800 is performed by a UE, such as the remote unit 105, the UE 201 and/or the user equipment apparatus 600. In certain embodiments, the method 800 may be performed by a processor executing program code, for example, a microcontroller, a microprocessor, a CPU, a GPU, an auxiliary processing unit, a FPGA, or the like.

The method 800 begins and establishes 805, a multiaccess data connection with a user plane function in the mobile communication network. The multiaccess data connection enables data communication via a non-third generation partnership program access network and via a third generation partnership program access network. The method 800 includes transmitting 810 a first performance measurement functionality message to the user plane function. The first performance measurement functionality message includes a first set of parameters including a quality of service flow identifier, and the first performance measurement functionality message 20) triggers a first network function in the mobile communication network to request a first type of analytics from a network data analytics function. The method 800 includes receiving 815 a second performance measurement functionality message from the user plane function in response to the network data analytics function providing the first type of analytics. The second performance measurement functionality message contains estimated round trip time values for the non-third generation partnership program access network, the third generation partnership program access network, or a combination thereof. The method 800 ends.

In certain embodiments, the method 800 further comprises applying the estimated round trip time values for determining how to route data traffic via the multiaccess data connection. In some embodiments, the first set of parameters comprises a cell identifier, a base station set identifier, a reporting period, at least one threshold, or some combination thereof. In various embodiments, the request for a first type of analytics comprises the quality of service flow identifier and the cell identifier, the base station set identifier, or a combination thereof. In one embodiment, the first network function comprises the user plane function.

In certain embodiments, the first network function comprises a session management function, and the user plane function transmits a first N4 message to the session management function in response to receiving the first performance measurement functionality message from the user equipment. In some embodiments, the first type of analytics comprises round trip time analytics for a non-third generation partnership program access network, for a third generation partnership program access network, or a combination thereof. In various embodiments, the round trip time analytics for the non-third generation partnership program access network, for the third generation partnership program access network, or the combination thereof are associated with the quality of service flow identifier.

Figure 9:
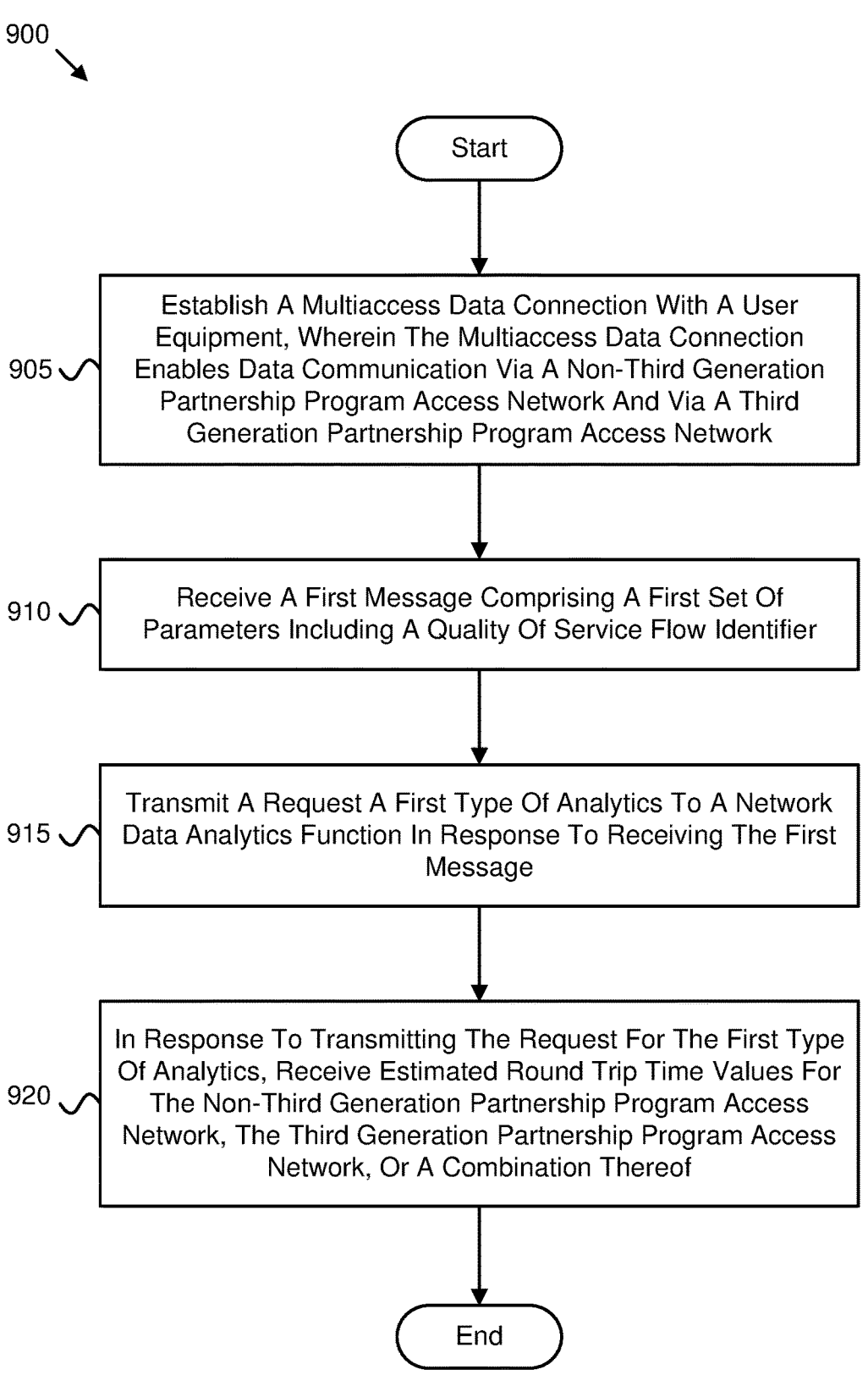
FIG. 9 is a flow chart diagram illustrating one embodiment of a second method for round trip time determination based on analytics.

FIG. 9 depicts a method 900 for round trip time determination based on analytics, according to embodiments of the disclosure. In some embodiments, the method 900 is performed by a network function, such as the UPF 205, the SMF 207, and/or the network apparatus 700. In certain embodiments, the method 900 may be performed by a processor executing program code, for example, a micro-controller, a microprocessor, a CPU, a GPU, an auxiliary processing unit, a FPGA, or the like.

The method 900 begins and establishes 905 a multiaccess data connection with a user equipment. The multiaccess data connection enables data communication via a non-third generation partnership program access network and via a third generation partnership program access network. The method 900 includes receiving 910 a first message including a first set of parameters including a quality of service flow identifier. The method 900 includes transmitting 915 a request a first type of analytics to a network data analytics function in response to receiving the first message. The method 900, in response to transmitting the request for the first type of analytics, receives 920 estimated round trip time values for the non-third generation partnership program access network, the third generation partnership program access network, or a combination thereof. The method 900 ends.

In certain embodiments, the first set of parameters comprises a cell identifier, a base station set identifier, a reporting period, at least one threshold, or some combination thereof. In some embodiments, the request for a first type of analytics comprises the quality of service flow identifier and the cell identifier, the base station set identifier, or a combination thereof.

In various embodiments, the first network function comprises a user plane function, and the first message is a first performance measurement functionality message transmitted by a user equipment. In one embodiment, the user plane function transmits a second performance measurement functionality message to the user equipment in response to receiving the estimated round trip time values, and the second performance measurement functionality message contains the estimated round trip time values. In certain embodiments, the first network function comprises a session management function, and the first message is a first N4 message transmitted by a user plane function in response to the user plane function receiving a first performance measurement functionality message from a user equipment.

In some embodiments, the session management function transmits a second N4 message to the user plane function in response to receiving the estimated round trip time values, the second N4 message contains the estimated round trip time values, the user plane function transmits a second performance measurement functionality message to the user equipment in response to receiving the second N4 message, and the second performance measurement functionality message contains the estimated round trip time values. In various embodiments, the first type of analytics comprises round trip time analytics for the non-third generation partnership program access network, for the third generation partnership program access network, or a combination thereof. In one embodiment, the round trip time analytics for the non-third generation partnership program access network and for the third generation partnership program access network are associated with the quality of service flow identifier.

In one embodiment, a method of a user equipment comprises: establishing a multiaccess data connection with a user plane function in the mobile communication network, wherein the multiaccess data connection enables data communication via a non-third generation partnership program access network and via a third generation partnership program access network; transmitting a first performance measurement functionality message to the user plane 20) function, wherein the first performance measurement functionality message comprises a first set of parameters including a quality of service flow identifier, and the first performance measurement functionality message triggers a first network function in the mobile communication network to request a first type of analytics from a network data analytics function; and receiving a second performance measurement functionality message from the user plane function in response to the network data analytics function providing the first type of analytics, wherein the second performance measurement functionality message contains estimated round trip time values for the non-third generation partnership program access network, the third generation partnership program access network, or a combination thereof.

In certain embodiments, the method further comprises applying the estimated round trip time values for determining how to route data traffic via the multiaccess data connection.

In some embodiments, the first set of parameters comprises a cell identifier, a base station set identifier, a reporting period, at least one threshold, or some combination thereof.

In various embodiments, the request for a first type of analytics comprises the quality of service flow identifier and the cell identifier, the base station set identifier, or a combination thereof.

In one embodiment, the first network function comprises the user plane function.

In certain embodiments, the first network function comprises a session management function, and the user plane function transmits a first N4 message to the session management function in response to receiving the first performance measurement functionality message from the user equipment.

In some embodiments, the first type of analytics comprises round trip time analytics for a non-third generation partnership program access network, for a third generation partnership program access network, or a combination thereof.

In various embodiments, the round trip time analytics for the non-third generation partnership program access network, for the third generation partnership program access network, or the combination thereof are associated with the quality of service flow identifier.

In one embodiment, an apparatus comprises a user equipment. The apparatus further comprises: a processor that establishes a multiaccess data connection with a user plane function in a mobile communication network, wherein the multiaccess data connection enables data communication via a non-third generation partnership program access network and via a third generation partnership program access network; a transmitter that transmits a first performance measurement functionality message to the user plane function, wherein the first performance measurement functionality message comprises a first set of parameters including a quality of service flow identifier, and the first performance measurement functionality message triggers a first network function in the mobile communication network to request a first type of analytics from a network data analytics function; and a receiver that receives a second performance measurement functionality message from the user plane function in response to the network data analytics function providing the first type of analytics, wherein the second performance measurement functionality message contains estimated round trip time values for the non-third generation partnership program access network, the third generation partnership program access network, or a combination thereof.

In certain embodiments, the processor applies the estimated round trip time values for determining how to route data traffic via the multiaccess data connection.

In some embodiments, the first set of parameters comprises a cell identifier, a base station set identifier, a reporting period, at least one threshold, or some combination thereof.

In various embodiments, the request for a first type of analytics comprises the quality of service flow identifier and the cell identifier, the base station set identifier, or a combination thereof.

In one embodiment, the first network function comprises the user plane function.

In certain embodiments, the first network function comprises a session management function, and the user plane function transmits a first N4 message to the session management function in response to receiving the first performance measurement functionality message from the user equipment.

In some embodiments, the first type of analytics comprises round trip time analytics for a non-third generation partnership program access network, for a third generation partnership program access network, or a combination thereof.

In various embodiments, the round trip time analytics for the non-third generation partnership program access network, for the third generation partnership program access network, or the combination thereof are associated with the quality of service flow identifier.

In one embodiment, a method at a first network function in a mobile communication network comprises: establishing a multiaccess data connection with a user equipment, wherein the multiaccess data connection enables data communication via a non-third generation partnership program access network and via a third generation partnership program access network; receiving a first message comprising a first set of parameters including a quality of service flow identifier; transmitting a request a first type of analytics to a network data analytics function in response to receiving the first message; and in response to transmitting the request for the first type of analytics, receiving estimated round trip time values for the non-third generation partnership program access network, the third generation partnership program access network, or a combination thereof.

In certain embodiments, the first set of parameters comprises a cell identifier, a base station set identifier, a reporting period, at least one threshold, or some combination thereof.

In some embodiments, the request for a first type of analytics comprises the quality of service flow identifier and the cell identifier, the base station set identifier, or a combination thereof.

In various embodiments, the first network function comprises a user plane function, and the first message is a first performance measurement functionality message transmitted by a user equipment.

In one embodiment, the user plane function transmits a second performance measurement functionality message to the user equipment in response to receiving the estimated round trip time values, and the second performance measurement functionality message contains the estimated round trip time values.

In certain embodiments, the first network function comprises a session management function, and the first message is a first N4 message transmitted by a user plane function in response to the user plane function receiving a first performance measurement functionality message from a user equipment.

In some embodiments, the session management function transmits a second N4 message to the user plane function in response to receiving the estimated round trip time values, the second N4 message contains the estimated round trip time values, the user plane function transmits a second performance measurement functionality message to the user equipment in response to receiving the second N4 message, and the second performance measurement functionality message contains the estimated round trip time values.

In various embodiments, the first type of analytics comprises round trip time analytics for the non-third generation partnership program access network, for the third generation partnership program access network, or a combination thereof.

In one embodiment, the round trip time analytics for the non-third generation partnership program access network and for the third generation partnership program access network are associated with the quality of service flow identifier.

In one embodiment, an apparatus comprises a first network function in a mobile communication network. The apparatus further comprises: a processor that establishes a multiaccess data connection with a user equipment, wherein the multiaccess data connection enables data communication via a non-third generation partnership program access network and via a third generation partnership program access network; a receiver that receives a first message comprising a first set of parameters including a quality of service flow identifier; and a transmitter that transmits a request a first type of analytics to a network data analytics function in response to receiving the first message; wherein, in response to transmitting the request for the first type of analytics, the receiver receives estimated round trip time values for the non-third generation partnership program access network, the third generation partnership program access network, or a combination thereof.

In certain embodiments, the first set of parameters comprises a cell identifier, a base station set identifier, a reporting period, at least one threshold, or some combination thereof.

In some embodiments, the request for a first type of analytics comprises the quality of service flow identifier and the cell identifier, the base station set identifier, or a combination thereof.

In various embodiments, the first network function comprises a user plane function, and the first message is a first performance measurement functionality message transmitted by a user equipment.

In one embodiment, the user plane function transmits a second performance measurement functionality message to the user equipment in response to receiving the estimated round trip time values, and the second performance measurement functionality message contains the estimated round trip time values.

In certain embodiments, the first network function comprises a session management function, and the first message is a first N4 message transmitted by a user plane function in response to the user plane function receiving a first performance measurement functionality message from a user equipment.

In some embodiments, the session management function transmits a second N4 message to the user plane function in response to receiving the estimated round trip time values, the second N4 message contains the estimated round trip time values, the user plane function transmits a second performance measurement functionality message to the user equipment in response to receiving the second N4 message, and the second performance measurement functionality message contains the estimated round trip time values.

In various embodiments, the first type of analytics comprises round trip time analytics for the non-third generation partnership program access network, for the third generation partnership program access network, or a combination thereof.

In one embodiment, the round trip time analytics for the non-third generation partnership program access network and for the third generation partnership program access network are associated with the quality of service flow identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of performed by a user equipment (UE), the method comprising:

establishing a multiaccess data connection with a user plane function in a mobile communication network, wherein the multiaccess data connection enables data communication via a non-third generation partnership program access network and via a third generation partnership program access network;

transmitting a first performance measurement functionality message to the user plane function, wherein the first performance measurement functionality message comprises a first set of parameters including a quality of service (QoS) flow identifier (ID), and the first performance measurement functionality message triggers a first network function in the mobile communication network to request a first type of analytics from a network data analytics function; and receiving a second performance measurement functionality message from the user plane function in response to the network data analytics function providing the first type of analytics, wherein the second performance measurement functionality message contains estimated round trip time values for the non-third generation partnership program access network, the third generation partnership program access network, or a combination thereof.

2. The method of claim 1, further comprising applying the estimated round trip time values for determining how to route data traffic via the multiaccess data connection.

3. A user equipment (UE), comprising:

at least one memory; and at least one processor coupled with the at least one memory and configured to cause the UE to:

establish a multiaccess data connection with a user plane function in a mobile communication network, wherein the multiaccess data connection enables data communication via a non-third generation partnership program access network and via a third generation partnership program access network;

transmit a first performance measurement functionality message to the user plane function, wherein the first performance measurement functionality message comprises a first set of parameters including a quality of service (QoS) flow identifier (ID), and the first performance measurement functionality message triggers a first network function in the mobile communication network to request a first type of analytics from a network data analytics function; and receive a second performance measurement functionality message from the user plane function in response to the network data analytics function providing the first type of analytics, wherein the second performance measurement functionality message contains estimated round trip time values for the non-third generation partnership program access network, the third generation partnership program access network, or a combination thereof.

4. The UE of claim 3, wherein the at least one processor is configured to cause the UE to apply the estimated round trip time values for determining how to route data traffic via the multiaccess data connection.

5. The UE of claim 3, wherein the first set of parameters comprises a cell ID, a base station set ID, a reporting period, at least one threshold, or a combination thereof.

6. The UE of claim 5, wherein the request for a first type of analytics comprises the QoS flow ID and the cell ID, the base station set ID, or a combination thereof.

7. The UE of claim 6, wherein the first network function comprises the user plane function.

8. The UE of claim 6, wherein the first network function comprises a session management function, and the user plane function transmits a first N4 message to the session management function in response to receiving the first performance measurement functionality message from the UE.

9. The UE of claim 8, wherein the first type of analytics comprises round trip time analytics for a non-third generation partnership program access network, for a third generation partnership program access network, or a combination thereof.

10. The UE of claim 9, wherein the round trip time analytics for the non-third generation partnership program access network, for the third generation partnership program access network, or the combination thereof are associated with the QoS flow ID.

11. An apparatus for performing a network function, the apparatus comprising:
at least one memory; and
at least one processor coupled with the at least one memory and configured to cause the apparatus to:
establish a multiaccess data connection with a user equipment (UE), wherein the multiaccess data connection enables data communication via a non-third generation partnership program access network and via a third generation partnership program access network;
receive a first message comprising a first set of parameters including a quality of service (QoS) flow identifier (ID);
transmit a request a first type of analytics to a network data analytics function in response to receiving the first message; and
in response to transmitting the request for the first type of analytics, receive estimated round trip time values for the non-third generation partnership program access network, the third generation partnership program access network, or a combination thereof.

12. The apparatus of claim 11, wherein the first set of parameters comprises a cell ID, a base station set ID, a reporting period, at least one threshold, or a combination thereof.

13. The apparatus of claim 12, wherein the request for a first type of analytics comprises the QoS flow ID and the cell ID, the base station set ID, or a combination thereof.

14. The apparatus of claim 13, wherein the first network function comprises a user plane function, and the first message is a first performance measurement functionality message transmitted by a UE.

15. The apparatus of claim 14, wherein the user plane function transmits a second performance measurement functionality message to the UE in response to receiving the estimated round trip time values, and the second performance measurement functionality message contains the estimated round trip time values.

16. A processor for wireless communication, comprising:
at least one controller coupled with at least one memory and configured to cause the processor to:
establish a multiaccess data connection with a user plane function in a mobile communication network, wherein the multiaccess data connection enables data communication via a non-third generation partnership program access network and via a third generation partnership program access network;
transmit a first performance measurement functionality message to the user plane function, wherein the first performance measurement functionality message comprises a first set of parameters including a quality of service (QoS) flow identifier (ID), and the first performance measurement functionality message triggers a first network function in the mobile communication network to request a first type of analytics from a network data analytics function; and
receive a second performance measurement functionality message from the user plane function in response to the network data analytics function providing the first type of analytics, wherein the second performance measurement functionality message contains estimated round trip time values for the non-third generation partnership program access network, the third generation partnership program access network, or a combination thereof.

17. The processor of claim 16, wherein the at least one controller is configured to cause the processor to apply the estimated round trip time values for determining how to route data traffic via the multiaccess data connection.

18. The processor of claim 17, wherein the first set of parameters comprises a cell ID, a base station set ID, a reporting period, at least one threshold, or a combination thereof.

19. The processor of claim 18, wherein the request for a first type of analytics comprises the QoS flow ID and the cell ID, the base station set ID, or a combination thereof.

20. The processor of claim 19, wherein the first network function comprises the user plane function.

* * * * *